United States Patent [19]
Collins

[11] Patent Number: 4,869,881
[45] Date of Patent: * Sep. 26, 1989

[54] OZONE GENERATOR SYSTEM

[75] Inventor: Wayne M. Collins, Oconomowoc, Wis.

[73] Assignee: Pillar Technologies, Inc., Hartland, Wis.

[*] Notice: The portion of the term of this patent subsequent to Sep. 13, 2005 has been disclaimed.

[21] Appl. No.: 189,539

[22] Filed: May 3, 1988

[51] Int. Cl.⁴ ............... C01B 13/11; B01J 19/08
[52] U.S. Cl. ............... 422/186.18; 422/186.07; 422/907; 422/186.15; 204/290 R
[58] Field of Search ............... 422/186.18, 186.19, 422/186.07, 186.15, 186.16, 907; 204/29 R, 179

[56] References Cited

U.S. PATENT DOCUMENTS

| | | | |
|---|---|---|---|
| 3,602,803 | 8/1971 | Six et al. | 422/186.15 |
| 3,899,684 | 8/1975 | Tenney | 422/186.15 |
| 4,051,043 | 9/1977 | Harter et al. | 422/186.15 |
| 4,128,768 | 12/1978 | Yamamoto et al. | 422/186.15 |
| 4,682,266 | 7/1987 | Huynh et al. | 422/186.16 X |

Primary Examiner—John F. Terapane
Assistant Examiner—Susan Wolffe
Attorney, Agent, or Firm—Foley & Lardner

[57] ABSTRACT

An ozone generator of the type having a high tension electrode and a grounded electrode mounted in a spaced relation, one of the electrodes having a dielectric member applied to or mounted on one of the surfaces of the electrode, the dielectric member including a layer of resilient dielectric material having a coating of particles of an inorganic material either sprinkled on or embedded in the surface of said dielectric material facing the other electrode and a timing circuit connected to said electrodes to provide a constant voltage pulse at intermittent time intervals, the voltage pulses being controlled by a silicon controlled rectifier and the frequency of said rectifier being controlled by a bilateral mosfet.

23 Claims, 4 Drawing Sheets

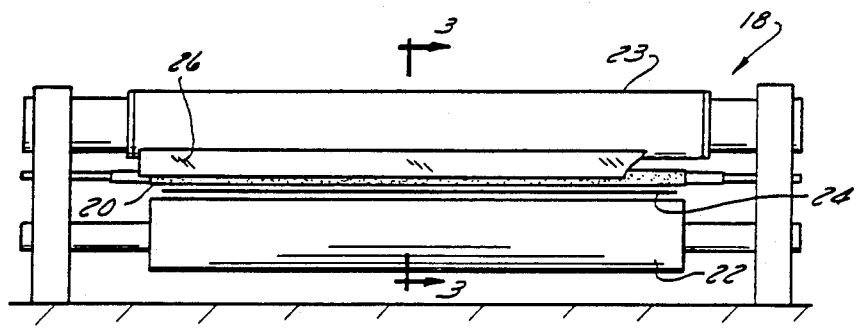
FIG. 2
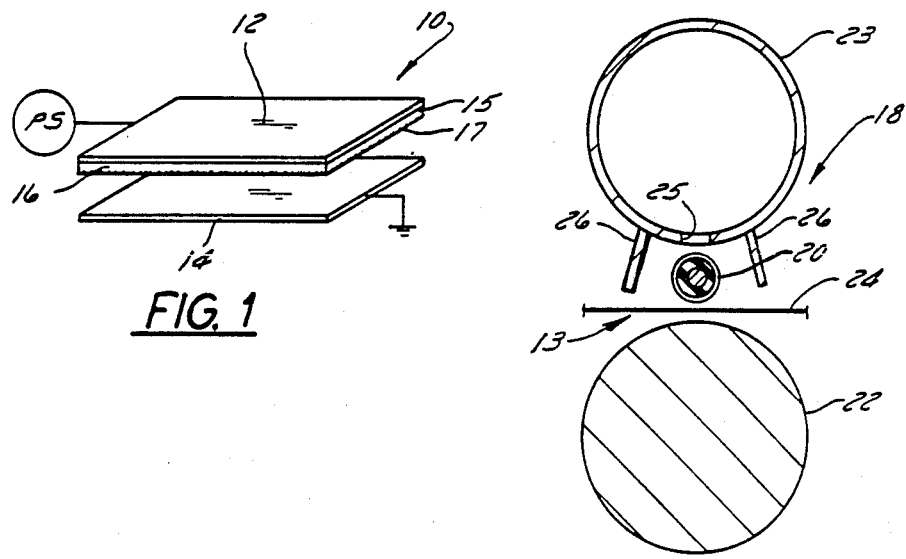
FIG. 1
FIG. 3
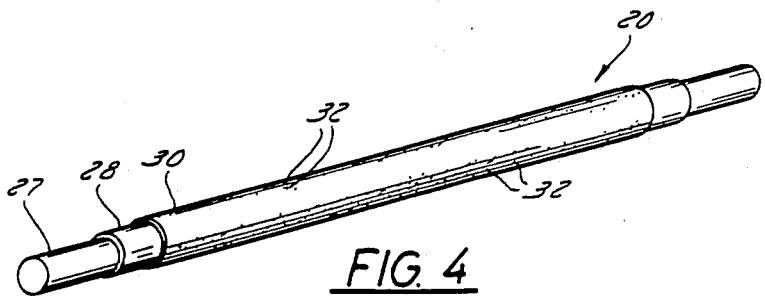
FIG. 4

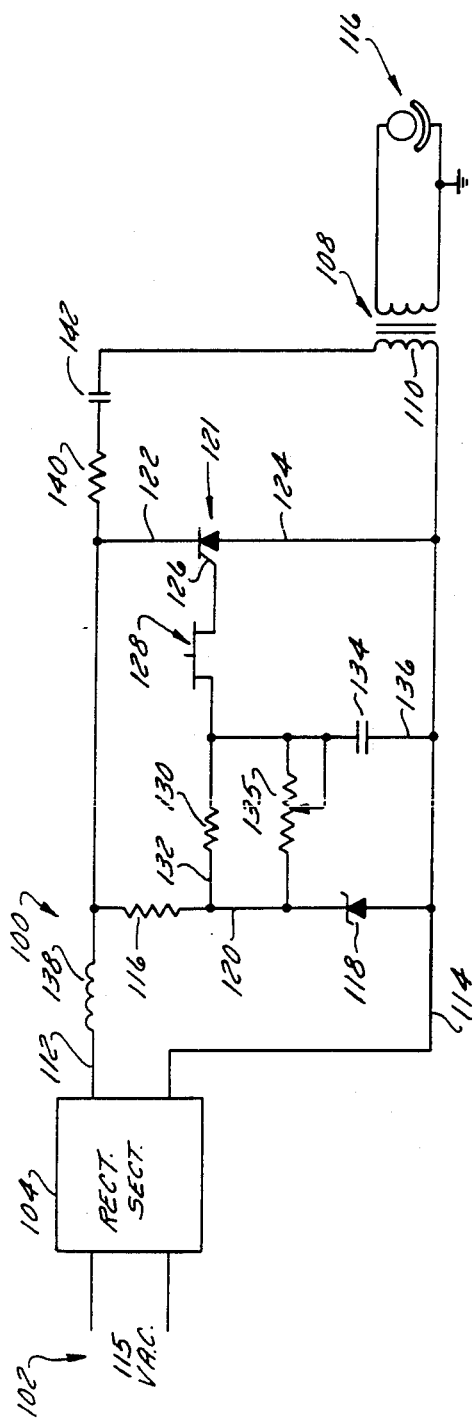
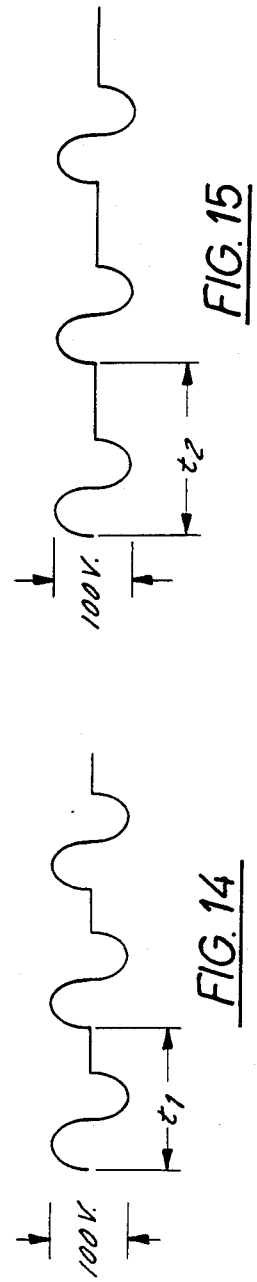
FIG. 13
FIG. 14
FIG. 15

OZONE GENERATOR SYSTEM

BACKGROUND OF INVENTION

1. Field of the Invention

The present invention is concerned with devices which generate ozone for numerous industrial applications such as oxidation of cyanide in electroplating waste, decolorization of dye stuffs, purification of refining waste water, disinfection of seawaters, treating paper for printing, water purification, odor control in sewage treatment and sterilization.

2. Related Application

This application contains subject matter common to U.S. Pat. No. 4,770,858 and entitled "Resilient Dielectric Electride for Corona Discharge Devices" and assigned to the same assignee.

3. Description of the Prior Art

Ozone generators commonly used today employ the corona discharge principle. This technique utilizes a high tension electrode and a ground electrode mounted in a spaced relation with a vitreous dielectric member covering one of the electrodes. The electrodes are connected to an electric power source to set up an electrostatic field or corona in the space between the dielectric material and one of the electrodes. An oxygen-containing gas (air or oxygen) is then passed through the space between the dielectric material and electrode.

Creation of the electric discharge field requires considerable expenditure of electrical energy. More than 80% of the electrical energy applied to the electric discharge field is converted to heat and, if this is not quickly removed from the electrostatic field, it will cause rapid decomposition of the product ozone back to oxygen. The rate of this reversal reaction increases rapidly above 35° C. and is almost instantaneous at temperatures in the range of 200° C. The dielectric member is generally in the form of a solid vitreous material such as glass, fused quartz or ceramic. Heat builds up in the vitreous dielectric material so that the material generally operates at temperatures approaching the critical 200° to 250° C. range. Proper cooling of the ozone generator is therefore critical to maintaining a practical operating efficiency and consistent yields of ozone. The temperature is usually maintained at approximately 100° to 150° C. by circulating air or oil along the back of the electrodes in order to cool the dielectric member. The vitreous materials are also very fragile requiring special handling both in manufacture as well as use.

In conventional ozone generators the inorganic materials are mixed with the dielectric material to create a homogeneous mass having an organic material distributed throughout the dielectric layer. High thermal conductivity is a requisite in the conventional ozone dielectric in order to allow the heat to flow through the dielectric to the heat sink which is in the form of a metal tube. Heat is carried away from the dielectric by passing a cooling liquid or gas through the interior of the electrode to maintain a low temperature on the electrode surface. In principal, a high thermal conductivity dielectric carries heat into the internal cooling medium more rapidly. In fact, cooling in this manner is ineffective because heat from exothermic reactions taking place in the corona region, causes highly localized surface heating which impairs ozone formation and causes formation of undesirable nitric oxides. Heat absorbed into the body of the highly conductive mixture of organic and inorganic materials only tends to accumulate in subsurface regions and contributes to the problem of temperature rise in the ionized air. Even cooling of the electrode or heat sink will not prevent heat build up in the ceramic material because of the temperature gradient which always exists through the cross section of a thermal conductor.

Prior art power supplies used for ozone generators have been of line frequency 60 HZ types and more recently higher frequency generators operating in the 800 to 1200 HZ frequency range. These power supplies apply a voltage in a sine wave form to the high voltage electrode. Others employ a circuit that forms a current wave form in a generally square wave configuration. Ozone generator electrodes have the general configuration of a capacitor and higher frequencies cause lower capacitive reactance, therefore, more current can be passed through a smaller discharge area. This more concentrated discharge, however, tends to cause increased heating of the electrode and a corresponding decrease in ozone production due to recombining of $O_3$ into $O_2$ at elevated temperatures.

SUMMARY OF INVENTION

The present invention is concerned with the combination of a composite dielectric and a timing circuit which maintains the operating temperature of the ozone generator at a low level in order to obtain a high level of ozone production. The composite dielectric includes a layer of metal oxide particles on the outside surface of thermally insulating dielectric material with the inner portion of the dielectric material having no more than 20% inorganic particles. More than 20% inorganic particles would reduce the effectiveness of the desired thermal barrier sought in this invention.

Since the greatest amount of heat in a corona region between a grounded metallic member and a dielectric covered member is always on the surface of the dielectric covered member, the invention teaches the use of an underlying thermal barrier which prevents surface heat from being absorbed into the body of the dielectric member. Air traveling through the space between the two electrodes then sweeps away surface heat and dissipates the heat in the air gap where it eventually makes contact wit the metallic outer electrode and is removed through the wall of the highly conductive metallic electrode. Heat transfer from a surface into air is directly proportional to temperature differential, therefore the primary object of the invention is to prevent heat from being absorbed into the body of the layer of dielectric material where heat can only accumulate on the surface of the dielectric material which differs enough from the temperature of the air to allow heat transfer into the air.

A further feature of the invention is to allow a layer of aluminum oxide to form on the inner surface of the metallic electrode, in effect creating a double dielectric layer. These dielectric layers are then disposed on each side of the air gap. The inner dielectric layer is a poor thermal conductor and the outer dielectric layer a good thermal conductor. The aluminum oxide layer forms on the interior of the aluminum electrode over a period of time because of the ozone and moisture present in the air gap, or it may be sprayed on or anodized prior to assembly. Heat buildup is always greatest on the dielectric layer and the presence of two layers of dielectric causes the heat to be divided between the two electrodes for more rapid dissipation into the passing air or through the wall of the metallic electrode.

A still further feature of this double dielectric is the avoidance of free electrons in the air gap, which tend to form nonreactive ions. Ozone production is improved because oxygen atoms have a high electron affinity and separate from $O_2$ molecules because of a greater attraction to the negative dielectric surface during the negative half of each cycle. Two dielectrics cause oxygen to separate and move toward the dielectric surface when either electrode is in its negative portion of its cycle. The absence of free electrons also prevents an avalanche-type of discharge commonly referred to as a spike or spark. These spikes contain enough heat energy to oxidize nitrogen and cause formation of toxic nitric oxides.

Another feature of this invention is the use of the timing circuit to increase ozone production by reducing the power required to produce ozone and as a consequence of reduced power less heat build up in the metal oxide layer. This is accomplished by providing a constant voltage pulse at intermittent intervals to thereby reduce heat build up and energy cost.

The invention greatly reduces the cost of manufacturing ozone generators because expensive cooling apparatus and/or air preparation devices are not required. The system can be manufactured at a cost of less than 10% of the cost of ozone generators disclosed and described in the prior art. Size and weight are also reduced by 90%. Ozone generators built according to the prior art have been far too expensive in capital cost and electrical energy cost to be practical for anything but laboratory use or municipal applications. Since its introduction in early November until the end of December 1987, more than 2,000 ozone generators making use of this new technology have been sold. This is more than many old line manufacturers have sold in all the years of their existence. The meaning of this technology to worldwide water quality and the quality of mankind's health is immeasurable and overwhelming demand already exists for this product.

The advancement and the state of the art embodied in this patent have already changed an industry and will, in due course, have a major impact on a problem of major concern to mankind—the ever shrinking supply of safe potable water.

DESCRIPTION OF THE DRAWINGS

FIG. 1 is a schematic view of a typical ozone generator.

FIG. 2 is a front elevation view of an ozone generator in the form of a corona treater station having a cylindrical high tension electrode spaced from a bare roll electrode.

FIG. 3 is a view taken on line 3—3 of FIG. 2 showing the spacing between the cylindrical electrode and the bare roll electrode.

FIG. 4 is a perspective view of one of the high tension electrodes of FIG. 2 showing the improved dielectric member according to the invention in the form of a sleeve surrounding the electrode.

FIG. 13 is a wiring diagram of the timing circuit for the ozone generator.

FIG. 14 is a wave diagram showing a voltage pulse at a time interval $t_1$.

FIG. 15 is a view similar to FIG. 14 at a time interval $t_2$.

Figure 5:
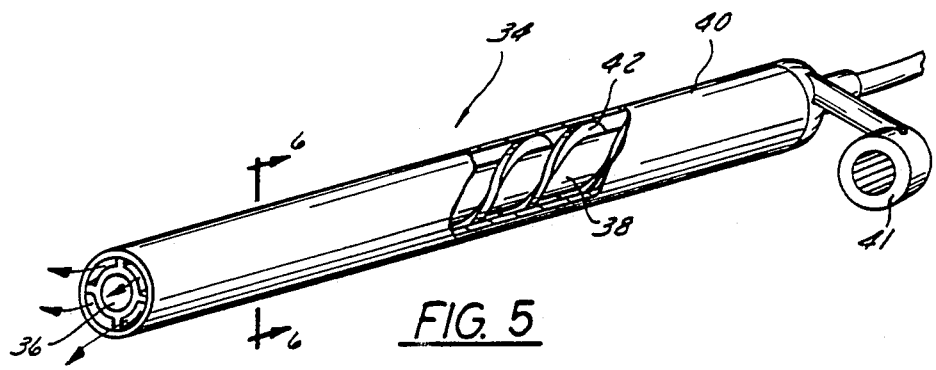
FIG. 5 is a perspective view of another form of ozone generator having a cylindrical high tension electrode supported within a tubular grounded electrode with the dielectric member mounted on the high tension electrode.

Before one embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE INVENTION

As shown in FIG. 1, ozone generators 10 of the type contemplated herein generally include a generating chamber 13 defined by means of a high tension electrode 12 and a grounded electrode 14. A dielectric member 16 is provided either on the high tension electrode 12 or the grounded electrode 14. An electrostatic field or corona discharge is created between the electrodes by connecting the timing circuit 17 to an electrical power source PS and to the high tension electrode 12 and ground electrode 14. Air or oxygen is then passed between the electrodes to discharge ozone produced in the electrostatic field set up between the electrodes. The dielectric member 16 according to the invention is formed from an elastomeric thermally insulating material 15 having particles of inorganic material 17 on the surface of the resilient dielectric material 15 facing the other electrode.

Figure 7:
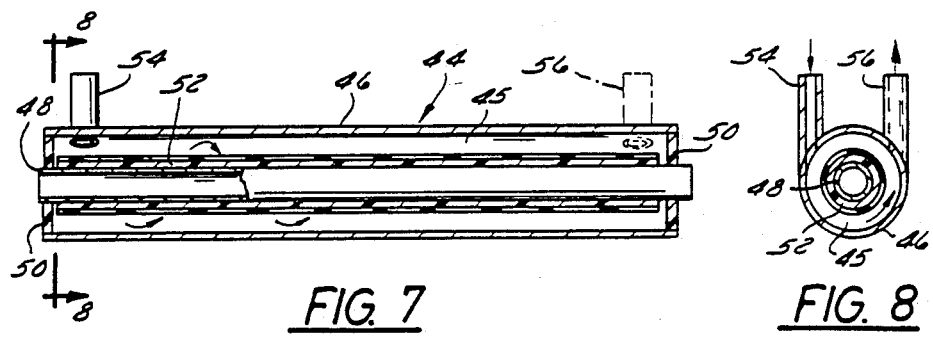
FIG. 7 is a front elevation view in cross section of another form of an ozone generator having a cylindrical electrode supported in a tubular housing which is open at both ends.
Figure 12:
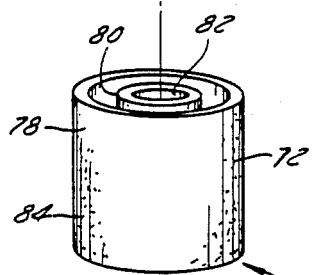
FIG. 12 is an exploded perspective view of one of the electrode segments.

In this regard, the resilient dielectric member 6 is formed from an elastomeric organic compound such as silicon rubber, "HYPALON" or an epoxy. "HYPALON" is a trademark of Dupont De Nemours E. I. & Co. for 600orosulphinated polyethylene. The elastomeric material 16 can be made in the form of a plate as seen in FIG. 1, a sleeve as seen in FIGS. 4, 5 or 7, or a cup as seen in FIG. 12.

The inorganic material 17 can be of either a ceramic formed from a metal oxide such as aluminum oxide or silica. In either case, particles of the inorganic material are coated on the surface of the dielectric material or embedded in the surface of the dielectric material. The particles of inorganic material 17 should cover the entire surface of the resilient dielectric material 15. It has been found that the electrostatic field is produced between the particles of inorganic material and the bare electrode. The heat generated is then limited to the thin layer of the particles of inorganic material. The resilient dielectric material acting as a thermal insulator. The heat generated in this thin layer of particles of inorganic material is dissipated by the flow of air or oxygen passing through the space between the electrodes.

In this regard, the inorganic material can be formed on the surface of the resilient dielectric material by covering the elastomeric material with a layer of uncured silicon rubber. The particles of inorganic material are then sprinkled, sprayed or pressed into the layer of uncured silicon rubber. The rubber is allowed to cure with the points of the particles of inorganic material protruding from the surface of the dielectric material.

When the dielectric material is subjected to corona, the dielectric material around the inorganic material will erode away due to the electrostatic field which will expose the particles of inorganic material resulting in the formation of a layer of inorganic material of irregular contour on the surface of the dielectric material. Corona has a preference for the exposed points of the particles of inorganic material. As the dielectric material erodes away, the irregular surface formed by the particles of inorganic material will be sufficiently exposed to absorb all of the corona and thereby stop further erosion of the dielectric material.

The heat produced by the production of corona in the ozone generator is absorbed by the particles of inorganic material. Heat build up occurs only in the particles of inorganic material, the silicon rubber acts as a thermal insulator. The normal flow of air through the generator is sufficient to dissipate this heat build up so that the generator operates at a much cooler temperature.

Ozone generators are used for many treating applications where ozone is used to treat a particular product. In FIGS. 2, 3 and 4 the ozone generator 18 shown is in the form of a corona treating station of the type used to treat the surface of a sheet of plastic film 24 so that the printing characteristic of the film is improved. The generator 18 includes a high tension electrode 20 and a grounded bare roll electrode 22. The electrode 20 is supported by means of an exhaust plenum or housing 23 having exhaust ports 25 and shielded by plates 26. An A.C. power source not shown is connected to the high tension electrode 20 and the bare roll electrode 22 is grounded. Air is drawn around the electrode 20 for discharge into the plenum through exhaust ports 25. A strip of film 24 is passed through the electrical discharge field produced in the space between the electrodes 20 and 22. This type of treatment is common in the treatment of plastic films for printing.

The high tension electrode 20 in this type of generator includes an electrically conductive rod 27 having a sleeve 28 of resilient elastomeric material, a layer 30 of uncured elastomeric material coated on the sleeve 28 and a layer of particles of inorganic material 32 embedded in the surface of the uncured material. The particles of inorganic material 32 can be rolled into the surface of the sleeve 28 or sprinkled on the layer 30 of uncured elastomeric material which is allowed to cure in order to hold the particles of inorganic material in place.

Figure 6:
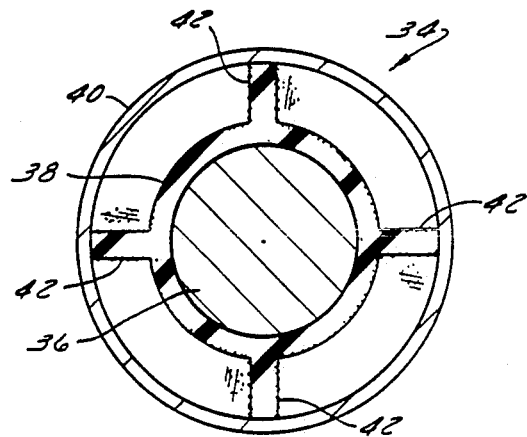
FIG. 6 is a cross sectional view taken on line 6—6 of FIG. 5 showing a spacer located between the cylindrical electrode and tubular grounded electrode.

In FIGS. 5 and 6 an ozone generator 34 is shown having a generating chamber 35 through which a stream of air is passed in order to blow the ozone into the area to be treated. The generating chamber 35 is defined by means of an electrically conductive tubular electrode 36 having resilient dielectric member 38 in the form of a sleeve as described above. An electrically conductive hollow metal electrode 40 is supported in a spaced relation to the electrode 36 by means of a series of spirally wound dielectric spacers 42. A power source as described above is connected across the electrode 36 and 40 to produce ozone in the channels formed in the space between the electrodes. Air is then blown or drawn through the generator by means of a blower 41 mounted on the end of electrode 40 to discharge the ozone either into or onto the product or material to be treated.

Figure 8:
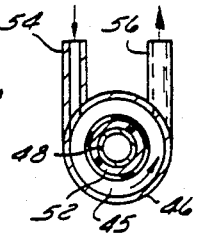
FIG. 8 is a cross sectional view taken on line 8—8 of FIG. 7 showing one of the ozone generator segments shown in FIG. 7.
Figure 9:
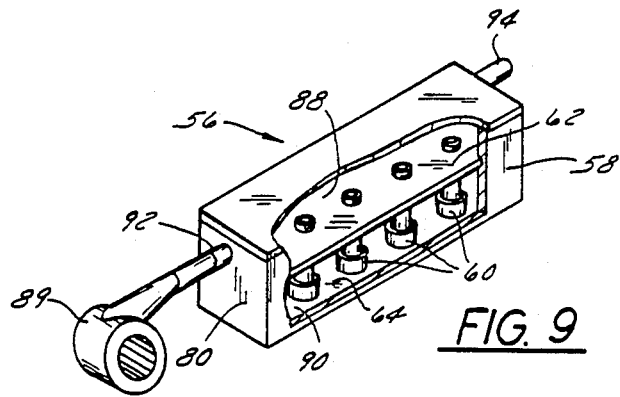
FIG. 9 is a perspective view partly broken away of a segmented type of ozone generator.

In FIGS. 7 and 8, an ozone generator 44 is shown having a generating chamber 45, defined by means of a tubular electrically conductive housing 46 having a tubular high tension electrode 48 supported by insulating end plates 50 in housing 46. A dielectric member 52 in the form of a sleeve is mounted on the tubular electrode 48. An inlet pipe 54 is provided at one end of the housing 46 and an outlet pipe 56 is provided on the other end of the opposite side of the electrode 48. Air is blown through pipe 54 which by means of a motor 55 circulates around the electrode 48 and exit through pipe 56.

Figure 10:
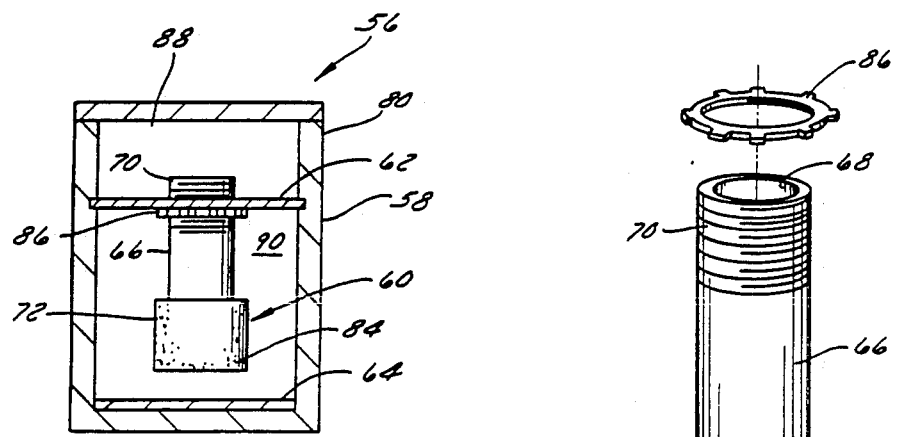
FIG. 10 is an end view in cross section of the ozone generator of FIG. 9.
Figure 11:
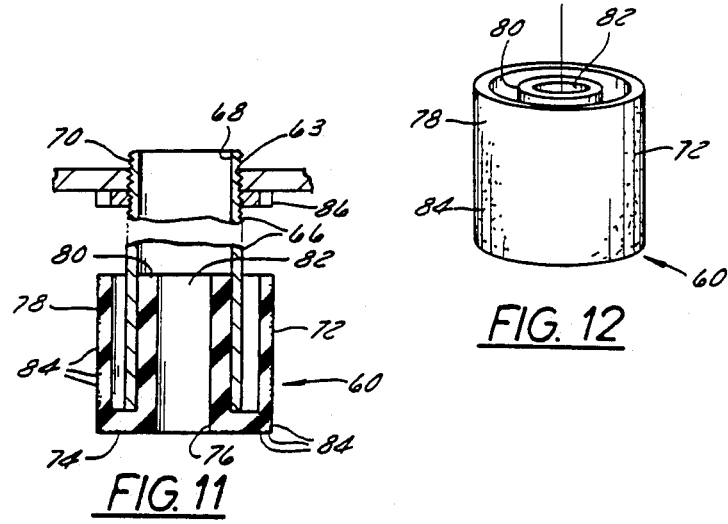
FIG. 11 is a cross section view of one of the electrode segments.

In FIGS. 9, 10, 11 and 12, a segmented type ozone generator 56 is shown which includes an insulating housing 58 having a number of high tension electrodes 60 mounted in a conductive plate 62 and in a spaced relation to a grounded electrode 64. Each of the electrodes 60 as seen in FIGS. 10 and 11 includes an electrically conductive tubular member 66 having an axial passage 68 and a threaded section 70 at one end. A cup-shaped resilient dielectric member 72 is mounted on the other end of the member 66. The cup-shaped member 72 is formed of elastomeric material and includes a base 74 having an opening 76 and a cylindrical wall 78. A tubular member 80 having an axial passage 82 is formed on the center of the base 74 with the opening 76 in alignment with the passage 82. A layer of particles of inorganic material 84 is provided on the outer surface of the base and cylindrical walls of the cup-shaped member 72.

The electrodes 60 are adjustably supported in plate 62 by means of a lock nut 86 mounted on the threaded end 70 of tube 66. The threaded end 70 of the tube 66 being received in a threaded opening 63 in the plate 62. The tube 66 can be moved up or down in the plate and locked in position by nut 86. The plate 62 separates the housing 58 into an air compartment 88 and an ozone generating chamber 90. Air is blown into the compartment 88 by a blower 89 through inlet passage 92 and exits through the passages 68 in the electrodes 66 into compartment 90. The air discharged from passage 68 impinges on electrode 60 and forces the ozone generated in compartment 90 out through discharge passage 94.

The production of ozone can be further increased by using a timing circuit 100 shown as FIG. 13. In this regard, it should be noted that, as pointed out above, the lower the temperature of operation of the ozone generator, the greater the amount of ozone production. The timing circuit 100 is shown connected to an AC power source 102 through an AC/DC rectifier section 104 and to an ozone generator 106 through a high voltage transformer 108. The positive terminal of rectifier section 104 is connected to the primary 110 of the transformer 106 by a electric line 112 and the negative terminal of rectifier section 104 is connected to the primary 110 of transformer 106 by line 114. The timing circuit 100 is connected across lines 112 and 114 to provide a voltage pulse of constant amplitude at an intermittent frequency to the generator 106.

In this regard, the timing circuit includes a 120K ½ w resistance 116 and a 12 V zener diode 118 are connected in series across the lines 114 and 116 by a line 120. A 0.39 millihenery choke 138 is connected in line 112 between the rectifier section 104 and line 120. A 10 amp high speed SCR (silicon controlled rectifier) 121 is connected across lines 112 and 114 by means of lines 122 and 124. The gate circuit 126 of the SCR 121 is connected to the line 120 through a G. E. 4992 Bilateral mosfet 128 and a 5K ½ watt resistor 130 by means of a line 132. The mosfet 128 is controlled by means of a 10K potentiometer 135 connected across lines 120 and 136. A 0.047 mfd. 100 V capacitance 134 is provided in line 136. A 1 mfd. 600 VDC capacitor 142 is provided in line 112 between line 122 and the primary 110 of transformer 108. A 5 ohm 20 W resistance 140 may be provided in series with capacitor 142 in line 112.

The power supply described above makes use of the bilateral mosfet 128 to fire the SCR 124. The bilateral mosfet 128 applies pulses of current to the gate 126 of the SCR 124 which chops a DC bus voltage into a high frequency AC. The pulses delivered by the transistor are proportional to the voltage applied to the transistor and a change in resistance value will increase the voltage across the transistor causing the output frequency of the chopper to vary the output sine wave from the chopper for a fixed duration, usually around two milliseconds. The frequency $t_1$ of the gate pulses to the SCR as shown in FIG. 14 can be changed to a frequency $t_2$ as shown in FIG. 15 by reducing the operating frequency of the SCR.

The advantage of a circuit of this type is two fold. The bilateral mosfet 28 is inexpensive and replaces complex control circuitry that is far more costly. The second advantage is that output control of the ozone generator 106 is not accomplished by variations in output voltage as in prior art devices, but is achieved by providing fixed voltage pulses at preset intervals. The pulses establishing the power applied to the electrodes. This fixed voltage allows air to be ionized even at very low output current levels and permits precise control of the output for maximum ozone production. The time interval $t_1$, $t_2$ between the voltage pulses may be set to a level that produces maximum ozone production but minimum heating. The time between pulses is of a duration sufficient to allow short cooling periods of the electrode and the ionized air but ionization is continually maintained due to the fact that ionization is not instantly stopped when current is removed. Ionized air particles have enough weight and inertia to remain ionized during the short, less than ten millisecond period between pulses. Additional input of power during these rest periods only contributes to buildup of heat and a degradation of ozone. Current flow during these periods also contributes to the cost of ozone production by wasting electrical energy as heat.

Thus, it should be apparent that there has been provided, in accordance with the invention, an ozone generator system that fully satisfies the aims and advantages set forth above. While the invention has been described in conjunction with specific embodiments thereof, it is still evident that many alternatives, modifications, and variations will be apparent to those skilled in the art. Accordingly, it is intended to embrace all such alternatives, modifications and variations as fall within the spirit and broad scope of the appended claims.

The embodiments of the invention in which an exclusive property or privilege is claimed, are defined as follows:

1. An ozone generator comprising an electrically conductive high tension member;
   an electrically conductive grounded member and a resilient dielectric member covering the surface of one of said conductive members facing the other of said members;
   said resilient dielectric member being formed from a resilient elastomeric material and an inorganic material, embedded in the surface of said dielectric material, facing the other of said members; and
   a timing circuit operably connected to said high tension member, said circuit including means for providing fixed voltage pulses to said electrodes at intermittent frequency.

2. The ozone generator according to claim 1 wherein said dielectric material is silicon rubber.

3. The ozone generator according to claim 1 wherein said conductive member is cylindrical in form and said dielectric member is in the form of a hollow dielectric sleeve made of said elastomeric dielectric material which closely fits the outer surface of said cylindrical member.

4. The ozone generator according to claims 1, 2 or 3 wherein said inorganic material is aluminum oxide.

5. The ozone generator according to claims 1, 2 or 3 wherein said inorganic material comprises particles of ceramic material.

6. An ozone generator comprising:
   a grounded conductive member and a high tension conductive member supported in a spaced relation to said grounded member;
   a resilient dielectric member covering the surface of one of said conductive members facing the other of said conductive members;
   said dielectric member including a layer of resilient dielectric material and a coating of inorganic material embedded in the surface of said dielectric material facing the other of said members; and
   a timing circuit connecting said high tension member to an electrical power source and the other of said members being connected to ground;
   said timing circuit including a means for providing constant voltage pulses to said conductive member at variable frequency, whereby an electrostatic field is intermittently created between said conductive members and means for passing air through said field between said members to discharge the ozone produced in said field.

7. The device according to claim 6 wherein said dielectric material is selected from the group consisting of silicon rubber, polyethylene or epoxy.

8. The device according to claim 6 or 7 wherein said inorganic material comprises silica particles.

9. The device according to claim 6 or 7 wherein said inorganic material comprises particles of ceramic material.

10. The device according to claim 6 wherein one of said conductive members is tubular and the other of said conductive members is a hollow cylinder.

11. The device according to claim 10 including means for supporting said cylinder in a spaced relation to said tubular member.

12. The device according to claim 10 or 11 wherein said dielectric material is silicon rubber.

13. The device according to claim 12 wherein said inorganic material comprises particles of ceramic.

14. An ozone generator system comprising:
a high tension electrode and a grounded electrode mounted in a spaced relation;
a dielectric member mounted on one of said electrodes;
means for passing air or oxygen through the space between said electrodes; and
a timing circuit connecting said high tension electrode to a power source, said timing circuit including first means for providing predetermined voltage pulses to said electrode and second means for varying the frequency of said voltage pulses.

15. The generator according to claim 14 wherein said dielectric member is formed of a layer of resilient elastomeric dielectric material and a layer of inorganic material on the surface of the dielectric material facing the other of said electrodes.

16. The dielectric member according to claim 15 wherein said dielectric material is selected from the group consisting of silicon rubber, polyethylene or epoxy.

17. The member according to claim 15 or 16 wherein said inorganic material is in the form of a powder or small particles.

18. The member according to claim 17 wherein said inorganic material is selected from the group consisting of a metal oxide or silica.

19. An apparatus for producing ozone comprising:
means defining a generating chamber in which ozone is generated from a stream of air or oxygen maintained at a substantially constant pressure in the stream's flow through the chamber; and
an ozone generating means in said chamber, including a high tension electrode, a grounded electrode mounted in a spaced relation to said high tension electrode and a dielectric member
provided on the surface of one of the electrodes facing the other electrode, said dielectric member including a layer of resilient elastometic dielectric material having particles of inorganic material covering the surface of the layer of dielectric material and a timing means connecting said high tension electrode to a power source, said timing means including a first circuit for establishing a constant voltage pulse in said high tension electrode and a second circuit for controlling the frequency of said pulses.

20. The apparatus according to claim 19 wherein said high tension electrode is in the form of a cylindrical tube.

21. The apparatus according to claim 19 wherein said high tension electrode is in the form of a hollow tube and said dielectric member is in the form of a cup mounted on the end of said tube.

22. The apparatus according to claim 19 wherein said second circuit includes a bilateral mosfet.

23. The apparatus according to claim 22 including means for controlling the operation of said mosfet whereby the frequency of voltage pulses can be set to provide maximum ozone production but minimum heating.

* * * * *